United States Patent
Ishii et al.

(10) Patent No.: US 6,927,526 B2
(45) Date of Patent: Aug. 9, 2005

(54) MOTOR

(75) Inventors: Hitoshi Ishii, Kiryu (JP); Katsuo Kawashima, Kiryu (JP); Hideo Takahashi, Kiryu (JP); Toshio Kobayashi, Kiryu (JP); Toshimi Abukawa, Kiryu (JP)

(73) Assignee: Japan Servo Co., Ltd., Tokyo (JP)

( * ) Notice: Subject to any disclaimer, the term of this patent is extended or adjusted under 35 U.S.C. 154(b) by 128 days.

(21) Appl. No.: 10/430,304

(22) Filed: May 7, 2003

(65) Prior Publication Data

US 2004/0017127 A1 Jan. 29, 2004

(30) Foreign Application Priority Data

May 8, 2002 (JP) ........................................ 2002-132193

(51) Int. Cl.⁷ ................................................ H02K 1/06
(52) U.S. Cl. ................... 310/261; 310/156.08; 310/217
(58) Field of Search .............................. 310/261, 262, 310/216–218, 156.08, 156.09, 156.11, 156.14, 156.17; 29/598

(56) References Cited

U.S. PATENT DOCUMENTS

| | | | | |
|---|---|---|---|---|
| 1,467,938 A | * | 9/1923 | Janette ........................ 403/252 |
| 2,421,115 A | * | 5/1947 | Carlson ........................ 29/598 |
| 3,482,125 A | * | 12/1969 | Fleckenstein ................. 310/42 |
| 3,544,820 A | * | 12/1970 | Wightman .................... 310/42 |
| 3,659,129 A | * | 4/1972 | Pettersen ..................... 310/216 |
| 3,783,317 A | * | 1/1974 | Sisk ............................ 310/212 |
| 4,427,911 A | * | 1/1984 | Manson ....................... 310/261 |
| 4,471,248 A | * | 9/1984 | Smetana ....................... 310/51 |
| 5,635,778 A | * | 6/1997 | Fujita et al. ................... 310/51 |
| 5,704,111 A | * | 1/1998 | Johnson et al. ............... 29/598 |
| 6,408,502 B1 | * | 6/2002 | Brahmavar et al. ........... 29/596 |
| 6,489,696 B2 | * | 12/2002 | Sashino et al. ................ 310/43 |

* cited by examiner

*Primary Examiner*—Dang Le
(74) *Attorney, Agent, or Firm*—Birch, Stewart, Kolasch & Birch, LLP

(57) ABSTRACT

A rotor of a motor is attached to a rotor axis slidably both in axial direction and rotational direction, each of elastic bodies is attached to each of side faces of the rotor, and the rotor is fastened to the rotor axis through the elastic body, mechanically by applying pressure on each of the side faces of the rotor in the axial direction through the elastic body, or chemically by bonding the rotor axis and each of the elastic bodies as well as each of the elastic bodies and each of the corresponding side faces of the rotor.

15 Claims, 6 Drawing Sheets

MOTOR

BACKGROUND OF THE INVENTION

1. Field of the Invention

The present invention concerns a motor used as a driving means for such as a cooling fan being widely used in a household electric appliance or in a business electronic apparatus.

2. Description of the Prior Art

A motor of the prior art for driving a fan or the like comprises, in general, a stator assembly fixed to a motor frame, brackets each of which is mounted respectively to each of end portions of the motor frame, bearings each of which is mounted respectively to each of the brackets, a rotor axis rotatably supported by the bearings, and a rotor fixed on the external surface of the rotor axis. A fan such as a propeller fan or a sirocco fan for cooling is attached to an end portion of the rotor axis.

In the motor of the prior art as explained above, the rotor is caused to vibrate by electromagnetic force acting between the rotor and the stator assembly. The vibration of the rotor is transmitted to the fan attached to the end portion of the rotor axis through the rotor axis. Particularly, resonance of the vibration of the rotor with that of the fan causes a great noise. An example of such noise generated by a fan motor of the prior art is shown in FIG. 9. In the example shown in FIG. 9, the noise generated by the fan motor of the prior art shows its peak at about 1250 rpm of rotational speed of the fan.

In order to reduce noise of a fan motor caused by vibration of a motor, it is necessary to cut off, as much as possible, transmission of vibration of a rotor to a rotor axis and to a fan.

To reduce transmission of vibration of a rotor to a rotor axis, a motor in which the rotor is fastened to the rotor axis with an elastic body inserted between internal surface of the rotor and external surface of the rotor axis has been proposed.

In such motor in the prior art, however, there is a problem that the vibration is not sufficiently absorbed by the elastic body, and the transmission of the vibration can not be sufficiently reduced, when the elastic body is thin. On the other hand, if the elastic body is thick, there is another problem that air-gap between the stator assembly and the rotor is made to be fluctuated by electromagnetic force acting between the rotor and the stator assembly since fixing of the rotor to the rotor axis becomes insufficient, and the vibration can not be reduced.

SUMMARY OF THE INVENTION

It is an object of the present invention to solve the above problems and to provide a motor capable of reducing transmission of vibration of a rotor to a rotor axis.

To achieve the above object, a motor of internal rotor type according to a preferred embodiment of the present invention comprises: a stator assembly fixed to an internal portion of a motor frame; brackets each of which is mounted respectively to each of end portions of the motor frame; bearings each of which is mounted respectively to each of the brackets; a rotor axis rotatably supported by the bearings; and a rotor attached on the external circumferential surface of the rotor axis, in which the rotor is attached to the rotor axis slidably both in axial direction and rotational direction, each of elastic bodies is attached to each of side faces of the rotor, and the rotor is fastened to the rotor axis through the elastic body.

In the motor according to the preferred embodiment of the present invention, the rotor is attached to the rotor axis slidably both in axial direction and rotational direction, each of the elastic bodies is attached to each of the side faces of the rotor, and the rotor is fastened to the rotor axis through the elastic bodies. Accordingly, vibration of the rotor can be absorbed by elastic deformation of the elastic bodies and the transmission of the vibration from the rotor into the rotor axis can be reduced. Further, although the rotor is slidable axially and rotationally relative to the rotor axis within the elastic deformation of the elastic bodies, displacement of the rotor in the direction perpendicular to the rotor axis is suppressed by the external surface of the rotor axis, and an air-gap between the rotor and the stator assembly can be maintained in a uniform value. Accordingly, the vibration caused by fluctuation in the value of the air-gap can also be prevented.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The present invention will be explained in detail referring to the attached drawings.

Figure 1:
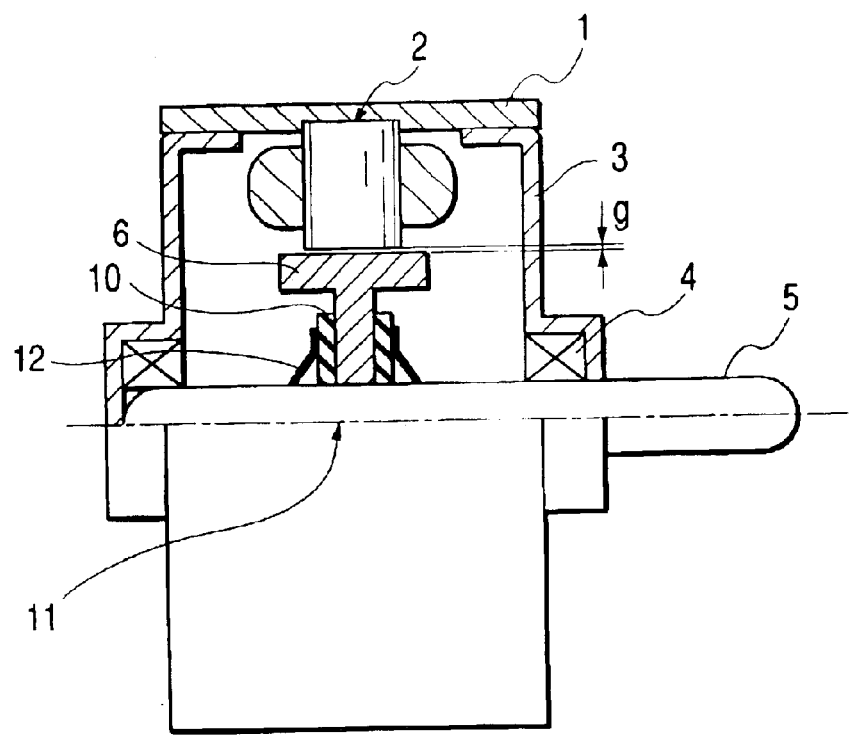
FIG. 1 is an axial half-sectional view of a motor according to a first embodiment of the present invention.

FIG. 1 is an axial half-sectional view of a motor according to the first embodiment of the present invention. The motor shown in the drawing is an motor of internal rotor type comprising a stator assembly 2 fixed to an internal portion of a motor frame 1, brackets 3 each of which is mounted respectively to each of end portions of the motor frame 1, bearings 4 each of which is mounted respectively to each of the brackets 3, a rotor axis 5 rotatably supported by the bearings 4, and a rotor 6 attached to the external surface of the rotor axis 5.

A rotor assembly 11 comprising the rotor 6 and the rotor axis 5 is assembled in the manner as follows. At first, the rotor axis 5 is attached, slidably in both axial direction and rotational direction, to the rotor 6. Then, each of elastic bodies 10 made of material such as a rubber is attached to each of side faces of the rotor 6. Then, each of push nuts 12, that are spring members, is pressed against each of the side faces of the elastic bodies 10 to press each of the side faces of the rotor 6 through each of the elastic bodies 10 in axial direction along the rotor axis 5 to fasten the rotor 6 mechanically to the rotor axis 5.

Preferably, joint strength between the rotor 6 and the rotor axis 5 is made to be a value that allows the rotor 6 to slide rotationally relative to the rotor axis 5, when a torque more than the maximum torque of the motor and less than twenty times the maximum torque of the motor is applied.

Vibration of the rotor 6 thus attached to the rotor axis 5 is absorbed by elastic deformation of the elastic bodies 10. Accordingly, transmission of the vibration from the rotor 6 into the rotor axis 5 can be reduced. Further, although the rotor 6 is slidable axially and rotationally relative to the rotor axis 5 within the elastic deformation of the elastic body 10, displacement of the rotor 6 in the direction perpendicular to the rotor axis 5 is suppressed by the external surface of the rotor axis 5. Thus, air-gap g between the rotor 6 and the stator assembly 2 can be maintained in a uniform value. Accordingly, vibration caused by fluctuation in the value of the air-gap g can also be prevented.

Figure 9:
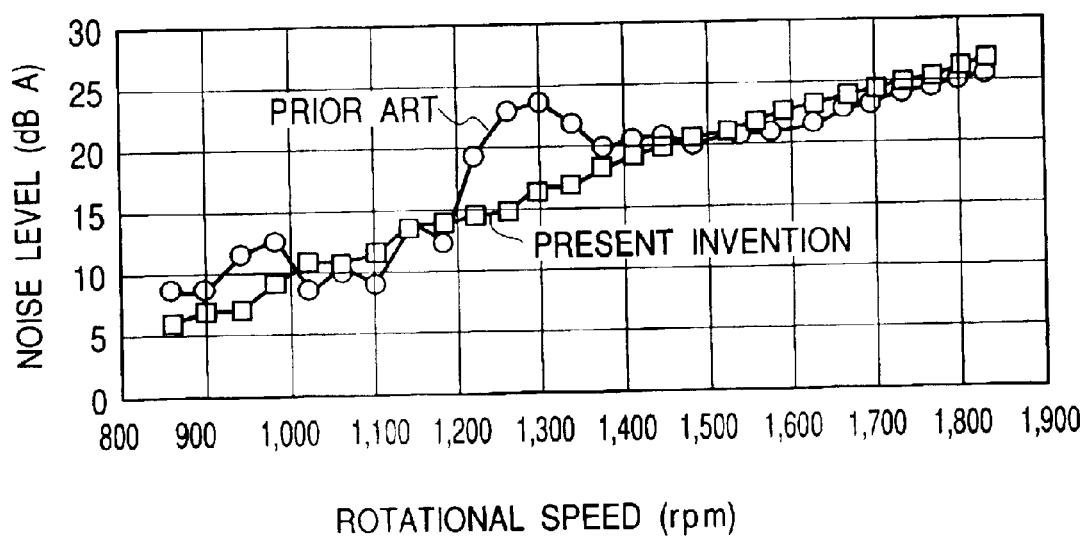
FIG. 9 is a graph showing relations between rotational speeds of motors and noise levels.

In FIG. 9, a relation between measured noise level and rotational speed of the motor according to the first embodiment of the present invention is shown. Also in the graph, a relation between noise level and rotational speed of a motor of the prior art in which a rotor is fastened to a rotor axis with an elastic body inserted between internal surface of the rotor and external surface of the rotor axis is shown for comparison. As can be seen in FIG. 9, in the motor according to the first embodiment of the present invention, although the noise level increases proportionally to the rotational speed, no predominant rise in the noise level at a particular frequency showing resonance is observed. On the contrary, a predominant rise in the noise level at a particular frequency showing resonance is observed in the motor of the prior art. Thus, comparing with the motor of the prior art, the motor according to the first embodiment of the present invention is capable of reducing effectively the noise caused by the vibration.

Figure 2:
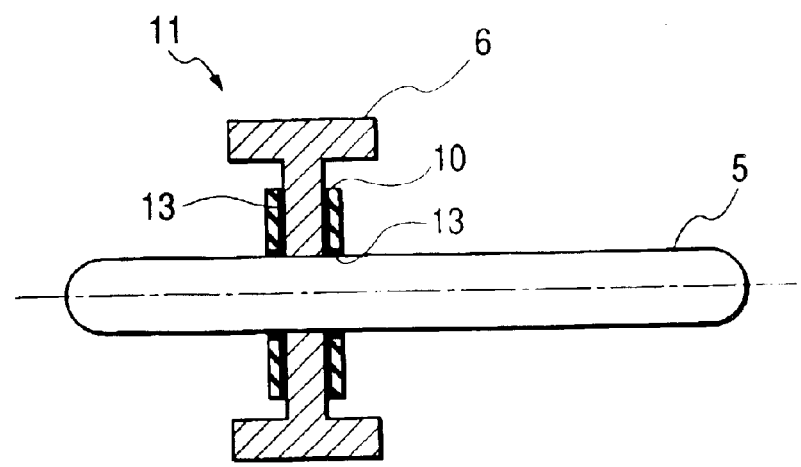
FIG. 2 is an axial sectional view of a rotor assembly according to a second embodiment of the present invention.

FIG. 2 is an axial sectional view of a rotor assembly 11 according to the second embodiment of the present invention.

In the first embodiment of the present invention, the rotor 6 is mechanically fastened to the rotor axis 5 using the push nuts 12 each of which presses each of the side faces of the elastic bodies 10 in the axial direction along the rotor axis 5. In the second embodiment of the present invention, the rotor axis 5 and the elastic body 10 as well as the elastic body 10 and the rotor 6 are chemically fastened using an adhesive 13.

The rotor assembly 11 according to the second embodiment of the present invention is identical with that in the first embodiment of the present invention except that the adhesive 13 is used in the former instead of the push nuts 12 in the latter to fasten the rotor 6 to the rotor axis 5.

The rotor assembly 11 according to the second embodiment of the present invention has similar advantage to that of the rotor assembly 11 according to the first embodiment of the present invention.

Figure 3:
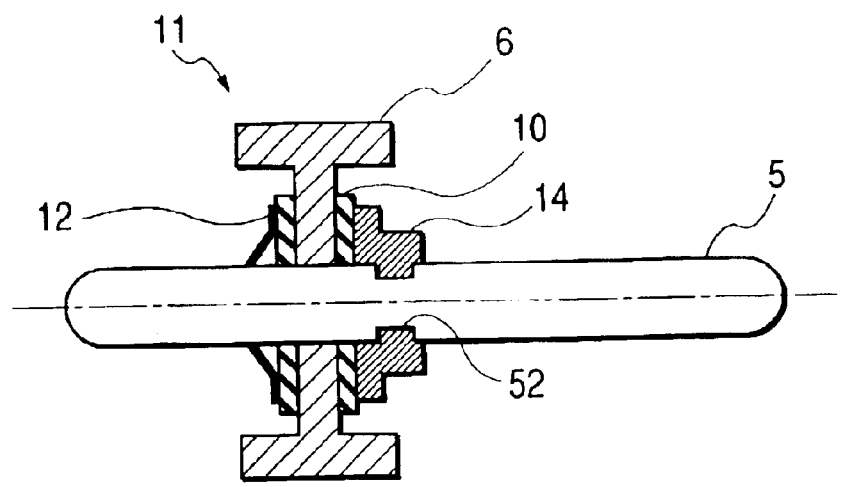
FIG. 3 is an axial sectional view of a rotor assembly according to a third embodiment of the present invention.

FIG. 3 is an axial sectional view of a rotor assembly 11 according to the third embodiment of the present invention. In the rotor assembly 11 according to the third embodiment of the present invention, a rotor holder 14, of which both axial and rotational movements are suppressed by a notch 52 formed on the surface of the rotor axis 5 and having D shaped cross section perpendicular to the axis of the rotor axis 5, is provided on the rotor axis 5. One of the side faces of the rotor 6, to which one of the elastic bodies 10 is attached, is supported by the rotor holder 14 through the elastic body 10. Another side face of the rotor 6 is pressed in the axial direction along the rotor axis 5 through another elastic body 10 by a push nut 12. Thus, the rotor 6 is fastened mechanically to the rotor axis 5.

The rotor assembly 11 according to the third embodiment of the present invention is identical with the rotor assembly according to the first embodiment of the present invention except that the rotor holder 14 is used in the former instead of one of the push nuts 12 in the latter.

The rotor assembly 11 according to the third embodiment of the present invention has an advantage that it is capable of effectively preventing idle running and fluttering of the rotor 6, in addition to similar advantage to that of the rotor assembly 11 according to the first embodiment of the present invention.

Figure 4:
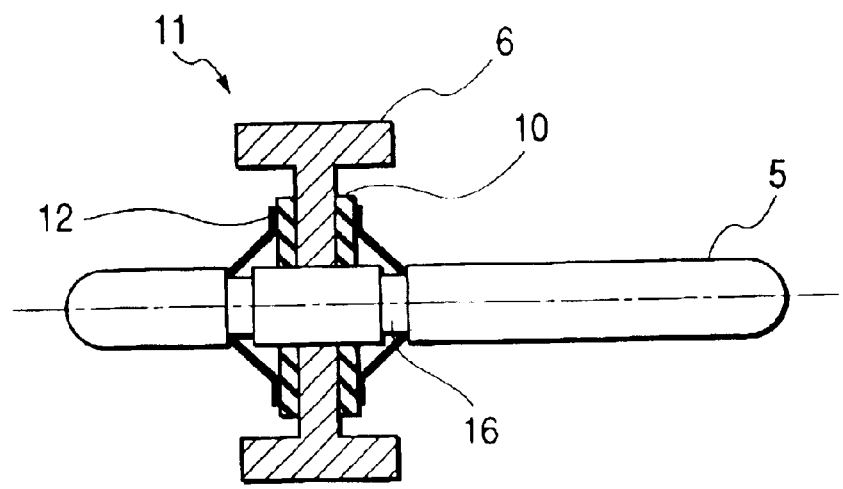
FIG. 4 is an axial sectional view of a rotor assembly according to a fourth embodiment of the present invention.

FIG. 4 is an axial sectional view of a rotor assembly 11 according to the fourth embodiment of the present invention. In the rotor assembly 11 according to the fourth embodiment of the present invention, circular grooves 16 are formed on the rotor axis 5. Each of edges of the push nuts 12 is placed in each of the circular grooves 16.

The rotor assembly 11 according to the fourth embodiment of the present invention is identical with the rotor assembly 11 according to the first embodiment of the present invention except that the circular grooves 6 are formed on the rotor axis 5 and each of the edges of the push nuts 12 is placed in each of the circular grooves 16.

The rotor assembly 11 according to the fourth embodiment of the present invention has an advantage that positioning of the push nuts 12, and consequently positioning of the rotor 6, can be made more precisely, in addition to similar advantage to that of the rotor assembly 11 according to the first embodiment of the present invention.

Figure 5:
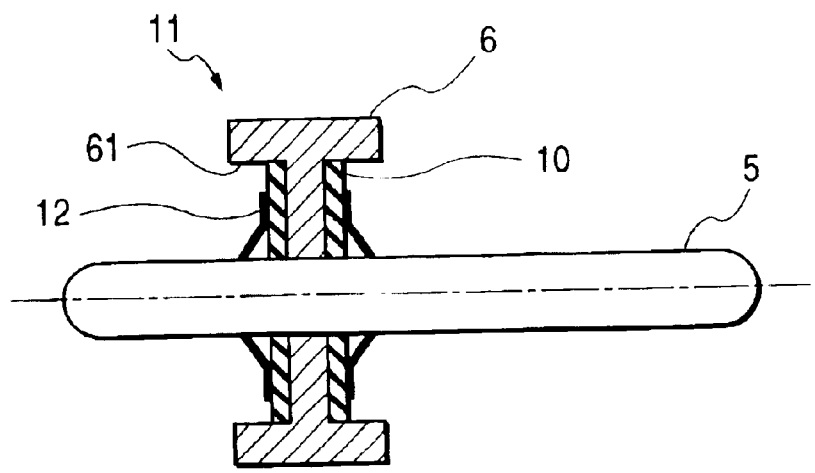
FIG. 5 is an axial sectional view of a rotor assembly according to a fifth embodiment of the present invention.

FIG. 5 is an axial sectional view of a rotor assembly 11 according to the fifth embodiment of the present invention. In the rotor assembly 11 of the fifth embodiment of the present invention, size of the elastic bodies 10 to be attached respectively to the respective side faces of the rotor 6 is made to be such one that each of the elastic bodies 10 contacts with both internal circumferential surface 61 of flange portion of the rotor 6 and external circumferential surface of the rotor axis 5. Each of the elastic bodies 10 is engaged between the internal circumferential surface 61 of the flange portion of the rotor 6 and the external circumferential surface of the rotor axis 5.

The rotor assembly 11 according to the fifth embodiment of the present invention is identical with the rotor assembly 11 according to the first embodiment of the present invention except that the size of the elastic bodies 10 is made to be such one that each of the elastic bodies 10 contacts with both the internal circumferential surface 61 of the flange portion of the rotor 6 and the external circumferential surface of the rotor axis 5.

The rotor assembly 11 according to the fifth embodiment of the present invention has an advantage, in addition to similar advantage to that of the rotor assembly 11 according to the first embodiment of the present invention, that movement of the rotor 6 in the direction perpendicular to the rotor axis 5 is suppressed, that air-gap between the rotor 6 and the stator assembly 2 can be easily maintained in a more uniform value, and that noise and vibration caused by fluctuation in the value of the air-gap can be prevented more effectively. These advantages are due to the improvement of the mechanical accuracy of the rotor 6 achieved by engaging the elastic bodies 10 between the internal circumferential surface 61 of the flange portion of the rotor 6 and the external circumferential surface of the rotor axis 5.

Figure 6:
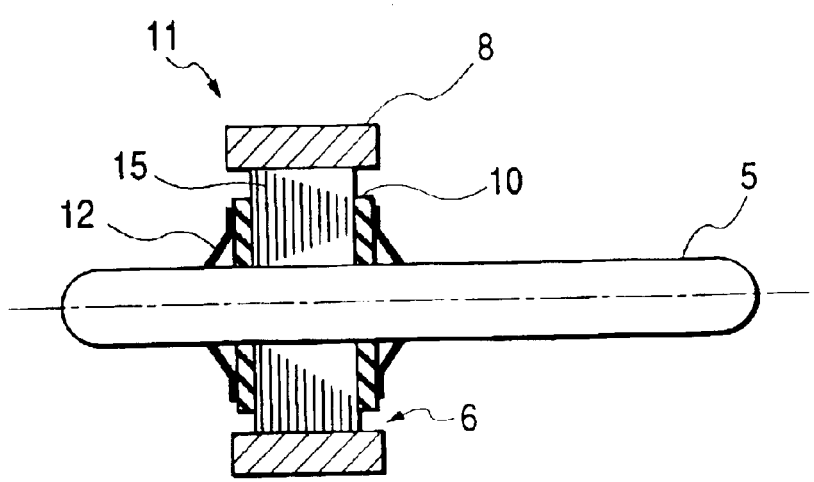
FIG. 6 is an axial sectional view of a rotor assembly according to a sixth embodiment of the present invention.

FIG. 6 is an axial sectional view of a rotor assembly 11 according to the sixth embodiment of the present invention. In the rotor assembly 11 according to the sixth embodiment of the present invention, a rotor 6 is composed of a permanent magnet 8 and a core 15 made of a metallic material.

The rotor assembly 11 according to the sixth embodiment of the present invention is identical with the rotor assembly 11 according to the first embodiment of the present invention except that the rotor 6 is composed of the permanent magnet 8 and the core 15 made of the metallic material. The rotor assembly 11 according to the sixth embodiment of the present invention has similar advantage to that of the first embodiment of the present invention. The core 15 may be made of a resin material.

Figure 7A:
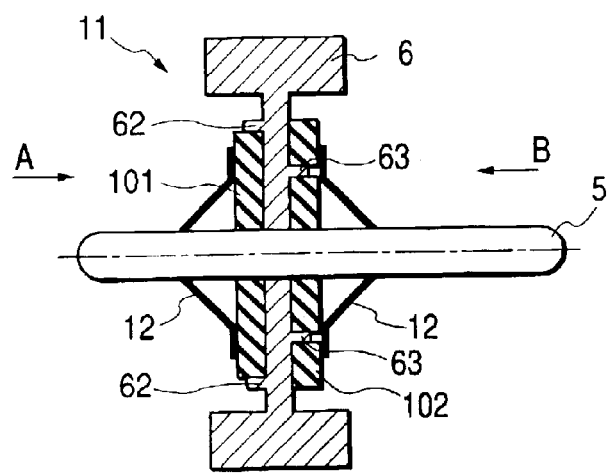
FIGS. 7(a) to 7(c) show a rotor assembly according to a seventh embodiment of the present invention.
Figure 7B:
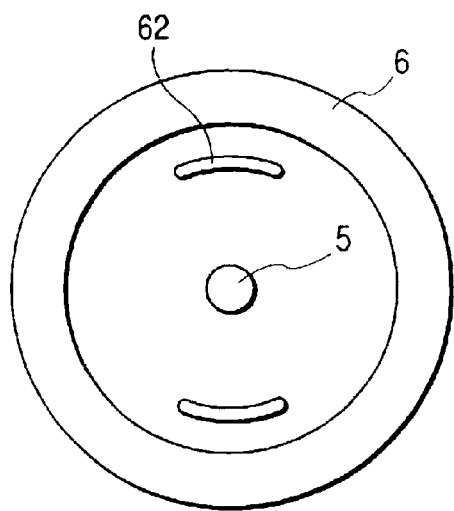
Figure 7C:
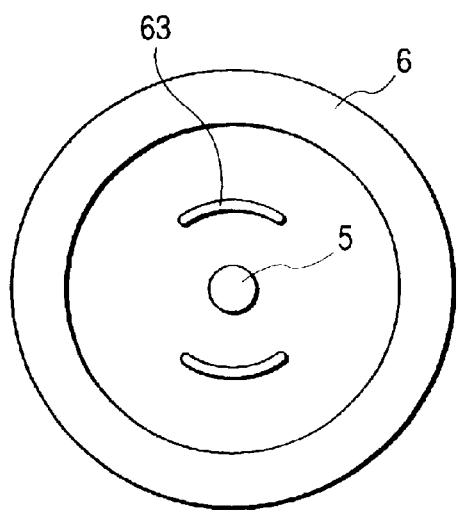
Figure 8A:
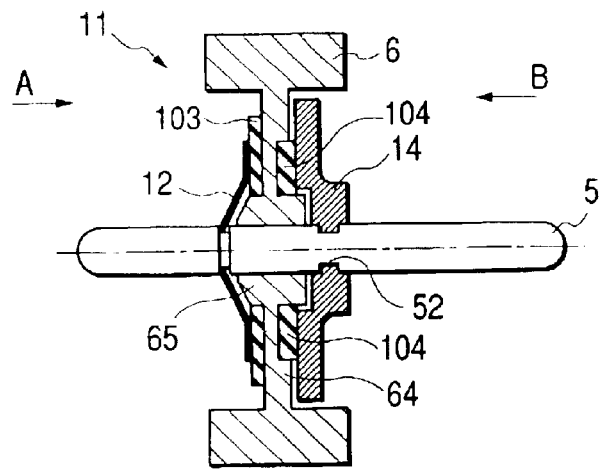
FIGS. 8(a) to 8(d) show a rotor assembly according to a eighth embodiment of the present invention.
Figure 8B:
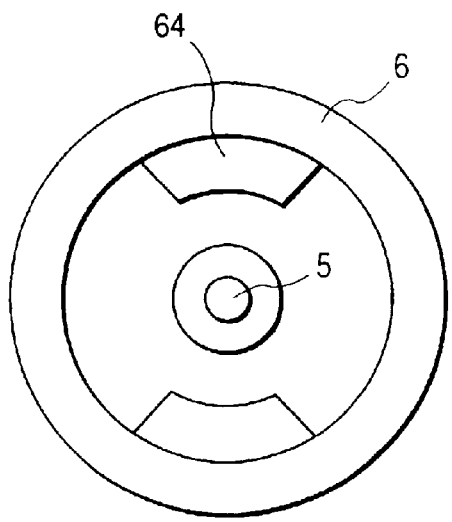
Figure 8C:
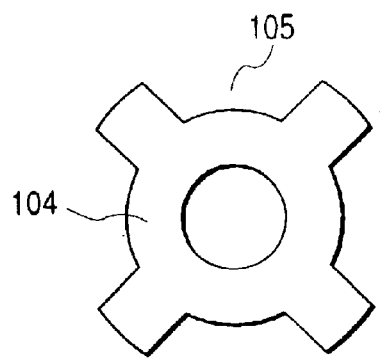
Figure 8D:
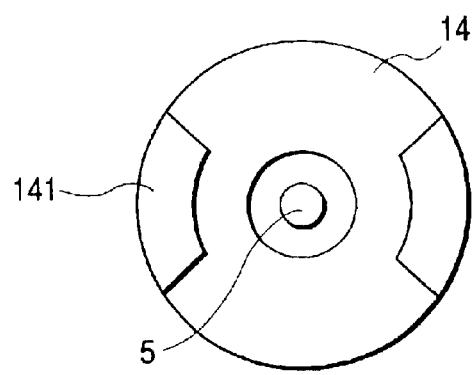

FIG. 7(*a*) is an axial sectional view of a rotor assembly according to a seventh embodiment of the present invention. In the rotor assembly 11 according to the seventh embodiment of the present invention, projection portions 62 are formed on one side face of the rotor 6, and projection portions 63 are also formed on the other side face of the rotor 6. Dent portions, into which the projection portions 62 are respectively engaged, are formed in an elastic body 101 which is to be placed in contact with the one side face of the rotor 6. Also, dent portions, into which the projection portions 63 are respectively engaged, are formed in a elastic body 102 which is to be placed in contact with the other side face of the rotor 6.

FIG. 7(*b*) shows the one side face of the rotor 6 seen in the direction shown by an arrow A in FIG. 7(*a*). As shown in FIG. 7(*b*), two projection portions 62 are formed circumferentially on the one side face of the rotor 6.

FIG. 7(*c*) shows the other side face of the rotor 6 seen in the direction shown by an arrow B in FIG. 7(*a*). As shown in FIG. 7(*c*), two projection portions 63 are also formed circumferentially on the other side face of the rotor 6.

The elastic body 101 in which the dents corresponding to the projection portions 62 are formed is attached to the one side face of the rotor 6. Also, the elastic body 102 in which the dents corresponding to the projection portions 63 are formed is attached to the other side face of the rotor 6. Then, each of the push nuts 12 are pressed against each of the side faces of the elastic bodies 101, 102 to press each of the side faces of the rotor 6 through each of the elastic bodies 101, 102, in axial direction along the rotor axis 5, to fasten the rotor 6 mechanically to the rotor axis 5.

Additionally, the dent portions may be formed in the side faces of the rotor 6 and the projection portions may be formed on the side faces of the elastic bodies 101, 102.

The rotor assembly 11 according to the seventh embodiment of the present invention is identical with the rotor assembly 11 according to the first embodiment of the present invention except that the projection portions 62, 63 are formed on the respective side faces of the rotor 6, and that dent portions to be engaged respectively into the projection portions 62, 63 are formed in the elastic bodies 101, 102.

The rotor assembly 11 according to the seventh embodiment of the present invention has an advantage, in addition to similar advantage to that of the rotor assembly 11 according to the first embodiment of the present invention, that idle running of the rotor 6 can be more effectively prevented, since each of the projection portions 62, 63 formed on the side faces of the rotor 6 and each of the dent portions formed in the elastic bodies 101, 102 engages each other to secure more firm fastening between them.

FIG. 8(*a*) is an axial sectional view of a rotor assembly according to a eighth embodiment of the present invention. In the rotor assembly 11 according to the eighth embodiment of the present invention, a projection portion 65 is formed on the central portion of one side face of the rotor 6 (left side face of the rotor 6 in FIG. 8(*a*)). An elastic body 103 of a doughnut-like form, in which a hole with which the projection portion 65 is engaged is formed in the central portion, is attached to the one side face of the rotor 6.

FIG. 8(*b*) shows the other side face of the rotor 6 (right side face of the rotor 6 in FIG. 8(*a*)) seen in the direction shown by an arrow B in FIG. 8(*a*). As shown in FIG. 8(*b*), two projection portions 64 are formed circumferentially on the other side face of the rotor 6.

FIG. 8(*c*) shows an elastic body 104 in which four cutout portions 105, of which two cutout portions 105 each corresponding to each of the projection portions 64 of the rotor 6, are formed along circumferential direction. The elastic body 104 is attached to the other side face of the rotor 6 with each of the projection portions 64 being engaged with each of the two cutout portions 105 in the four cutout portions 105.

FIG. 8(*d*) shows a side face of a holder 14 seen in the direction shown by an arrow A in FIG. 8(*a*). As shown in FIG. 8(*d*), two projection portions 141 are formed along circumferential direction on the side face of the holder 14. The holder 14 is attached to the elastic body 104 with each of the projection portions 141 being engaged with each of the two cutout portions 105 with which the projection portions 64 of the rotor 6 are not engaged.

In the rotor assembly 11 according to the eighth embodiment of the present invention, the rotor holder 14, of which both axial and rotational movements are suppressed by a notch 52 formed on the face of the rotor axis 5 and having D shaped cross section perpendicular to the axis of the rotor axis 5, or by other means such as a knurled surface, is provided on the rotor axis 5. The other side face of the rotor 6, to which the elastic body 104 is attached, is supported by the rotor holder 14 through the elastic body 104. The one side face of the rotor 6, to which the elastic body 103 is attached, is pressed in the axial direction along the rotor axis 5 through the elastic body 103 by a push nut 12. Thus, the rotor 6 is fastened mechanically to the rotor axis 5.

In the rotor assembly 11 according to the eighth embodiment of the present invention, the projection portions 64 formed on the other side surface of the rotor 6 and the cutout portions 105 formed in the elastic body 104, as well as the cutout portions 105 formed in the elastic body 104 and the projection portions 141 formed on the side face of the holder 14, are engaged with each other. Accordingly, the rotor assembly 11 according to the eighth embodiment of the present invention has an advantage, in addition to similar advantages to those of the rotor assemblies 11 according to any of the embodiments 1 to 7 of the present invention, that idle running and fluttering of the rotor 6 can be more effectively prevented.

In the motor according to the preferred embodiment of the present invention, the rotor is attached to the rotor axis slidably both in axial direction and rotational direction, each of the elastic bodies is attached to each of side faces of the rotor, and the rotor is fastened to the rotor axis through the elastic bodies. Accordingly, the vibration of the rotor can be absorbed by elastic deformation of the elastic bodies and the transmission of the vibration from the rotor into the rotor axis can be reduced. Further, although the rotor is slidable axially and rotationally relative to the rotor axis within the elastic deformation of the elastic bodies, displacement of the rotor in the direction perpendicular to the rotor axis is suppressed by the external surface of the rotor axis, and an air-gap between the rotor and the stator assembly can be maintained in a uniform value. Accordingly, the vibration caused by fluctuation in the value of the air-gap can also be prevented.

What is claimed is:

1. A motor of internal rotor type comprising:

a stator assembly fixed to an internal portion of a motor frame;

brackets each of which is mounted respectively to each of end portions of said motor frame;

bearings each of which is mounted respectively to each of said brackets;

a rotor axis rotatably supported by said bearings; and a rotor directly attached on the external circumferential surface of said rotor axis, wherein said rotor is attached to said rotor axis slidably both in axial direction and rotational direction;

each of elastic bodies is attached to each of outer side faces of said rotor; and said rotor is fastened to said rotor axis through said elastic body.

2. The motor according to claim 1 wherein said rotor is mechanically fastened to said rotor axis applying pressure on each of said outer side faces of said rotor in the axial direction of said rotor axis through said elastic body.

3. The motor according to claim 2 wherein a rotor holder is provided on said rotor axis, one of said outer side faces of said rotor to which one of said elastic bodies is attached is supported by said rotor holder through said one of elastic body, and another said outer side face of said rotor is pressed in said axial direction along said rotor axis through another said elastic body by a spring member to fasten said rotor mechanically to said rotor axis.

4. The motor according to claim 3 wherein said rotor holder is provided in a groove of said rotor axis.

5. The motor according to claim 3, wherein the one of said elastic bodies has a cutout portion which meshes with a projection portion of the rotor holder.

6. The motor according to claim 2 wherein circular grooves are formed on said rotor axis, each of spring members is placed respectively in each of said circular grooves, and each of said spring members is pressed against the corresponding each of said side faces of said elastic bodies to press each of said outer side faces of said rotor through each of said elastic bodies in axial direction along said rotor axis to fasten said rotor to said rotor axis.

7. The motor according to claim 1 wherein said rotor axis and each of said elastic bodies, and each of said elastic bodies and each of the corresponding said outer side faces of said rotor, are chemically fastened.

8. The motor according to claim 1 wherein an external circumferential portion of each of said elastic bodies contacts with an internal circumferential surface of a flange portion of said rotor.

9. The motor according to claim 1 wherein said rotor comprises a permanent magnet and a core made of a metallic material.

10. The motor according to claim 1 wherein said rotor comprises a permanent magnet and a core made of a resin material.

11. The motor according to claim 1 wherein projection portions or dent portions are formed on at least one of said outer side faces of said rotpr, and dent portions or projection portions to be engaged with said projection portions or said dent portions formed on said at least one of said outer side faces of said rotor are formed on side face of said elastic body contacting with said at least one of said outer side faces of said rotor.

12. The motor according to claim 1 wherein joint strength between said rotor and said rotor axis is made to be a value that allows said rotor to slide rotationally relative to said rotor axis, when a torque more than the maximum torque of said motor and less than twenty times the maximum torque of said motor is applied.

13. The motor according to claim 1 wherein an entire side face of each of said elastic bodies is attached to said outer side face of said rotor, and an inner circumferential face of each of the elastic bodies directly faces said rotor axis.

14. The motor according to claim 1 wherein an entire side face of each of said elastic bodies is attached to said outer side face of said rotor, and an inner circumferential face of each of the elastic bodies directly faces an outer circumferential face of a projection portion of said rotor.

15. The motor according to claim 1 wherein the elastic bodies are doughnut shaped.

* * * * *